US011876308B2

(12) United States Patent
Zhang et al.

(10) Patent No.: US 11,876,308 B2
(45) Date of Patent: Jan. 16, 2024

(54) MICRO-WAVE TRANSDUCER AND MANUFACTURING METHOD THEREOF

(71) Applicant: BOE TECHNOLOGY GROUP CO., LTD., Beijing (CN)

(72) Inventors: Dongdong Zhang, Beijing (CN); Qianhong Wu, Beijing (CN); Shuo Zhang, Beijing (CN); Yali Wang, Beijing (CN); Zongmin Liu, Beijing (CN); Feng Qu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 191 days.

(21) Appl. No.: 17/630,676

(22) PCT Filed: Mar. 4, 2021

(86) PCT No.: PCT/CN2021/079012

§ 371 (c)(1),
(2) Date: Jan. 27, 2022

(87) PCT Pub. No.: WO2022/183420

PCT Pub. Date: Sep. 9, 2022

(65) Prior Publication Data

US 2023/0163473 A1 May 25, 2023

(51) Int. Cl.
*H01Q 1/38* (2006.01)
*H01Q 9/04* (2006.01)
(Continued)

(52) U.S. Cl.
CPC ............. *H01Q 9/045* (2013.01); *H01P 3/081* (2013.01); *H01Q 21/08* (2013.01); *H01P 5/103* (2013.01); *H01Q 13/10* (2013.01)

(58) Field of Classification Search
CPC ........ H01Q 9/045; H01Q 21/08; H01Q 13/10; H01P 3/081; H01P 5/103
See application file for complete search history.

(56) References Cited

U.S. PATENT DOCUMENTS

2005/0035901 A1* 2/2005 Lyon .................. G01F 23/2962 342/52
2020/0011744 A1 1/2020 Xu et al.

FOREIGN PATENT DOCUMENTS

CN 101656350 A 2/2010
CN 103794880 A 5/2014
(Continued)

OTHER PUBLICATIONS

Wangboning, et al., "A Miniaturized Half-flexible UWB Slot Antenna", UESTC, Chengdu, China Academic Journal Electronic Publishing House, 2019.
(Continued)

*Primary Examiner* — Joseph J Lauture
(74) *Attorney, Agent, or Firm* — HOUTTEMAN LAW LLC

(57) ABSTRACT

The disclosure provides a micro-wave transducer and a manufacturing method thereof, and belongs to the technical field of communication. The micro-wave transducer includes: a dielectric layer having a first surface and a second surface oppositely arranged; a first electrode layer arranged on the first surface of the dielectric layer, and the reference electrode layer being provided with at least one first opening; at least one transducer electrode arranged on the second surface of the dielectric layer, wherein an orthographic projection of one transducer electrode on the dielectric layer is within an orthographic projection of one first opening on the dielectric layer; at least one first microstrip line arranged on the second surface of the dielectric layer, wherein one first microstrip line is configured to feed one transducer electrode.

20 Claims, 8 Drawing Sheets

(51) Int. Cl.

| | |
|---|---|
| ***H01P 3/08*** | (2006.01) |
| ***H01Q 21/08*** | (2006.01) |
| *H01P 5/103* | (2006.01) |
| *H01Q 13/10* | (2006.01) |

(56) References Cited

FOREIGN PATENT DOCUMENTS

| | | | |
|---|---|---|---|
| CN | 107528119 | A | 12/2017 |
| CN | 206727219 | U | 12/2017 |
| CN | 207808650 | U | 9/2018 |
| CN | 110828993 | A | 2/2020 |
| CN | 111430412 | A | 7/2020 |
| CN | 111509380 | A | 8/2020 |
| JP | 2008177660 | A | 7/2008 |

OTHER PUBLICATIONS

Teerapong Pratumsiri, et al., "Flexible Printed Antenna for Digital TV Reception", Department of Electrical Engineering, Chulalongkorn University, Bangkok, Thailand, 2017.

* cited by examiner

MICRO-WAVE TRANSDUCER AND MANUFACTURING METHOD THEREOF

TECHNICAL FIELD

The present invention belongs to the technical field of communication, and particularly relates to a micro-wave transducer and a manufacturing method thereof.

BACKGROUND

Compared with 4G (the 4th generation mobile communication technology), 5G (5th generation mobile communication technology) has the advantages of higher data rate, larger network capacity, lower time delay and the like. A 5G frequency plan includes two parts, namely, a low frequency band and a high frequency band, wherein the low frequency band (3-6 GHz) has good propagation characteristics and very abundant spectrum resources, so that development of a transducer unit and an array applied for the low frequency band communication gradually becomes a research and development hotspot at present.

SUMMARY

The present invention aims to solve at least one technical problem in the prior art and provides a micro-wave transducer and a manufacturing method thereof.

In a first aspect, an embodiment according to the present disclosure provides a micro-wave transducer, which includes:

a dielectric layer having a first surface and a second surface opposite to each other;

a first electrode layer on the first surface of the dielectric layer and with at least one first opening therein;

at least one transducer electrode on the second surface of the dielectric layer, wherein an orthographic projection of one of the at least one transducer electrode on the dielectric layer is within an orthographic projection of one of the at least one first opening on the dielectric layer; and at least one first microstrip line on the second surface of the dielectric layer, wherein one of the at least one first microstrip line is electrically connected to one of the at least one transducer electrode;

wherein one of the at least one transducer electrode, an orthographic projection of which on the dielectric layer is within an orthographic projection of one of the at least one first opening, the first opening and one of the at least one first microstrip line electrically connected to the transducer electrode form one transducer unit;

in the transducer unit, an orthographic projection of a first side of the first opening on the dielectric layer and an orthographic projection of a second side of the first microstrip line on the dielectric layer intersect at a first intersection point; an orthographic projection of the transducer electrode on the dielectric layer and an orthographic projection of the first microstrip line on the dielectric layer intersect at a second intersection point; and a distance between the first intersection point and the second intersection point is a first distance; and a maximum distance of the first opening along a normal direction through the first intersection point is a second distance, and the first distance is less than or equal to half of the second distance.

In the transducer unit, a ratio of an area of the orthographic projection of the transducer electrode on the dielectric layer to an area of the orthographic projection of the first opening on the dielectric layer is 0.017 to 0.67.

In the transducer unit, an orthographic projection of a center of the first opening on the dielectric layer, an orthographic projection of a center of the transducer electrode on the dielectric layer, and the first intersection point are on a same straight line.

The first opening includes a third side and a fourth side connected to the first side, and the transducer electrode includes a fifth side and a sixth side connected to the second side;

a distance between orthographic projections of the third side and the fifth side on the dielectric layer is a third distance, and a distance between orthographic projections of the fourth side and the sixth side on the dielectric layer is a fourth distance; and the third distance is greater than or equal to the first distance, and the fourth distance is greater than or equal to the first distance.

The third distance is equal to the fourth distance.

The first opening has substantially a same shape as the transducer electrode.

The micro-wave transducer further includes a feeding unit electrically connected to the at least one first micro-strip line.

The at least one first opening includes $2^n$ first openings, and at least two of the first openings have a same shape and a same size;

the feeding unit further includes n stages of second microstrip lines; and one second microstrip line at a $1^{st}$ stage is connected to two adjacent first microstrip lines, and the first microstrip lines connected to different second microstrip lines at the $1^{st}$ stage are different; one second microstrip line at an $m^{th}$ stage is connected to two adjacent second microstrip lines at an $(m-1)^{th}$ stage, and the second microstrip lines at the $(m-1)^{th}$ stage connected to different second microstrip lines at the $m^{th}$ stage are different; wherein n is greater than or equal to 2, m is greater than or equal to 2 and less than or equal to n, and both m and n are integers.

The micro-wave transducer includes a transducing region and a feeding region; the at least one transducer electrode is in the transducing region, and the feeding unit is in the feeding region; the first electrode layer is in the transducing region and the feeding region; and the first electrode layer includes a first sub-electrode in the transducing region and a second sub-electrode in the feeding region; and an orthographic projection of the second sub-electrode on the dielectric layer covers an orthographic projection of the feeding unit on the dielectric layer.

The first electrode layer has at least one second opening therein, the at least one second opening is in the feeding region; and an orthographic projection of the at least one second opening on the dielectric layer is not overlapped with the orthographic projection of the feeding unit on the dielectric layer.

The orthographic projection of the second sub-electrode on the dielectric layer covers an orthographic projection of the n stages of second microstrip lines on the dielectric layer; and at a same position on the dielectric layer, a line width of the orthographic projection of one second microstrip of the n stages of second microstrip lines is less than or equal to 0.5 times a width of the orthographic projection of the second sub-electrode.

An orthographic projection of at least one stage of the n stages of second microstrip lines on the dielectric layer divides the orthographic projection of the second sub-electrode on the dielectric layer into two parts with different areas.

The first electrode layer is has at least one third opening therein; the at least one third opening is in the transducing region; and a total area of the at least one second opening is greater than a total area of the at least one third opening.

The dielectric layer is a flexible material; and the flexible material includes at least one of polyimide and polyethylene terephthalate.

The dielectric layer includes a first dielectric sub-layer, a first adhesive layer, a second dielectric sub-layer, a second adhesive layer and a third dielectric sub-layer, which are stacked; a surface of the first dielectric sub-layer away from the first adhesive layer serves as the first surface of the dielectric layer, and a surface of the third dielectric sub-layer away from the second adhesive layer serves as the second surface of the dielectric layer; and a material of the first dielectric sub-layer and the third dielectric sub-layer includes polyimide, and a material of the second dielectric sub-layer includes polyethylene terephthalate.

The dielectric layer includes a first dielectric sub-layer, a first adhesive layer, a second dielectric sub-layer, a second adhesive layer and a third dielectric sub-layer, which are stacked, wherein a surface of the first dielectric sub-layer close to the first adhesive layer serves as the first surface of the dielectric layer, and a surface of the third dielectric sub-layer close to the second adhesive layer serves as the second surface of the dielectric layer; and a material of the first dielectric sub-layer and the third dielectric sub-layer includes polyimide, and a material of the second dielectric sub-layer includes polyethylene terephthalate.

The dielectric layer includes a first dielectric sub-layer, a first adhesive layer and a second dielectric sub-layer, which are stacked, a surface of the first dielectric sub-layer away from the first adhesive layer serves as the first surface of the dielectric layer, and a surface of the second dielectric sub-layer away from the first adhesive layer serves as the second surface of the dielectric layer; and a material of the first dielectric sub-layer includes polyimide, and a material of the second dielectric sub-layer includes polyethylene terephthalate, or, a material of the first dielectric sub-layer includes polyethylene terephthalate, and a material of the second dielectric sub-layer includes polyimide.

A thickness of the second dielectric sub-layer is greater than a thickness of the first dielectric sub-layer or the third dielectric sub-layer; and thicknesses of the first dielectric sub-layer and the third dielectric sub-layer are equal to each other.

A ratio of a thickness of the dielectric layer to a thickness of the transducer electrode is 20 to 450.

The micro-wave transducer further includes a protective layer on a side of the transducer electrodes away from the dielectric layer; and an orthographic projection of the protective layer on the dielectric layer covers an orthographic projection of the transducer electrodes on the dielectric layer.

In a second aspect, an embodiment of the present disclosure provided a manufacturing method of a micro-wave transducer, including:

providing a dielectric layer;

forming a first electrode layer on a first surface of the dielectric layer through a patterning process, such that at least one first opening is formed in the first electrode layer; and forming a pattern including at least one transducer electrode and at least one first microstrip line on a second surface of the dielectric layer through a patterning process; wherein an orthographic projection of one of the at least one transducer electrode on the dielectric layer is within an orthographic projection of one of the at least one first opening on the dielectric layer.

The dielectric layer includes a first dielectric sub-layer, a first adhesive layer, a second dielectric sub-layer, a second adhesive layer and a third dielectric sub-layer, which are sequentially stacked; and the manufacturing method includes: providing the first dielectric sub-layer;

forming the first electrode layer on the first dielectric sub-layer through a patterning process;

coating the first adhesive layer on a side of the first dielectric sub-layer away from the first electrode layer, forming the second dielectric sub-layer on the first adhesive layer, then forming the second adhesive layer on a surface of the second dielectric sub-layer away from the first adhesive layer, and forming the third dielectric sub-layer on the second adhesive layer; and forming the pattern including the at least one transducer electrode and the at least one first microstrip line on the third dielectric sub-layer through a patterning process.

The dielectric layer includes a first dielectric sub-layer, a first adhesive layer, a second dielectric sub-layer, a second adhesive layer and a third dielectric sub-layer, which are sequentially stacked; the manufacturing method includes:

providing the first dielectric sub-layer;

forming a first electrode layer on the first dielectric sub-layer through a patterning process;

providing the third dielectric sub-layer;

forming the pattern including the at least one transducer electrode and the at least one first microstrip line on the third dielectric sub-layer through a patterning process; and providing the second dielectric sub-layer, and bonding a side of the first dielectric sub-layer, on which the first electrode layer is formed, with the second dielectric sub-layer through the first adhesive layer, and bonding a side of the second dielectric sub-layer, on which the at least one transducer electrode and the at least one first microstrip line are formed, with the second dielectric sub-layer.

DETAIL DESCRIPTION OF EMBODIMENTS

In order to enable one of ordinary skill in the art to better understand the technical solutions of the present invention, the present invention will be further described in detail below with reference to the accompanying drawings and specific embodiments.

Unless defined otherwise, technical or scientific terms used herein shall have the ordinary meaning as understood by one of ordinary skill in the art to which this disclosure belongs. The use of "first," "second," and the like in the present disclosure is not intended to indicate any order, quantity, or importance, but rather serves to distinguish one element from another. Also, the use of the terms "a," "an," or "the" and the like does not denote a limitation of quantity, but rather denotes the presence of at least one. The word "comprising" or "comprises", and the like, means that the element or item preceding the word includes the element or item listed after the word and its equivalent, but does not exclude other elements or items. The terms "connected" or "coupled" and the like are not restricted to physical or mechanical connections, but may include electrical connections, whether direct or indirect. "Upper", "lower", "left", "right", and the like are used only to indicate relative positional relationships, and when the absolute position of the object being described is changed, the relative positional relationships may also be changed accordingly.

Figure 1:
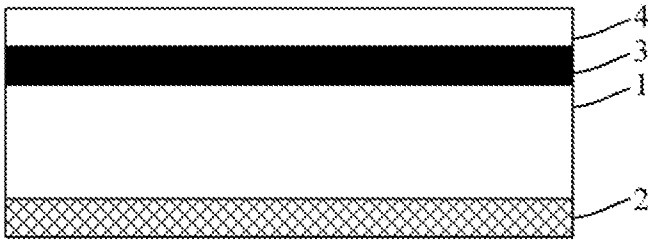
FIG. 1 is a cross-sectional view of a micro-wave transducer in an embodiment according to the present disclosure.
Figure 2:
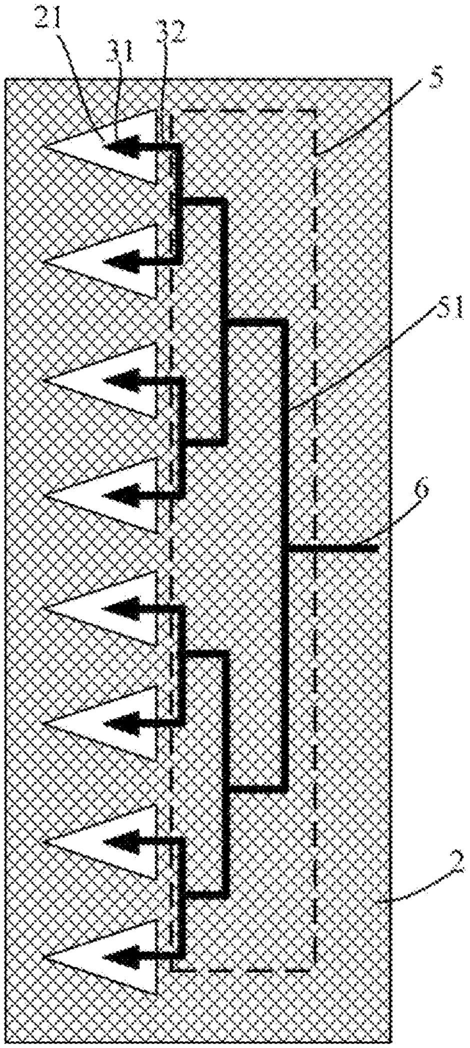
FIG. 2 is a top view of a micro-wave transducer in an embodiment according to the present disclosure.
Figure 3:
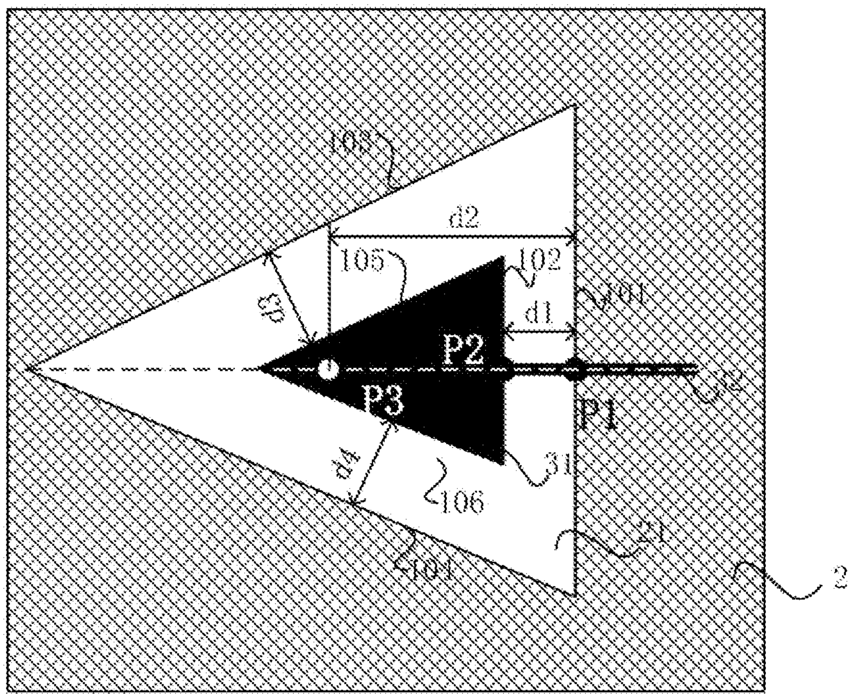
FIG. 3 is a schematic diagram of a transducer unit in an embodiment according to the present disclosure.

In a first aspect, FIG. 1 is a cross-sectional view of a micro-wave transducer in an embodiment according to the present disclosure; FIG. 2 is a top view of a micro-wave transducer in an embodiment according to the present disclosure; FIG. 3 is a schematic diagram of a transducer unit in an embodiment according to the present disclosure; as shown in FIGS. 1 to 3, an embodiment according to the present disclosure provides a micro-wave transducer, which includes a dielectric layer 1, a first electrode layer 2, transducer electrodes 31 and a first microstrip line 32.

The dielectric layer 1 includes a first surface and a second surface which are oppositely arranged. For example, as shown in FIG. 1, the first surface is a lower surface of the dielectric layer 1, and the second surface is an upper surface of the dielectric layer 1.

The first electrode layer 2 is arranged on the first surface of the dielectric layer 1, and at least one first opening 21 is arranged in the first electrode layer 2. A voltage written to the first electrode layer 2 is a reference voltage; the reference voltage includes, but is not limited to, a ground voltage.

Transducer electrodes 31 are arranged on the second surface of the dielectric layer 1, and an orthographic projection of one transducer electrode 31 on the dielectric layer 1 is within an orthographic projection of one corresponding first opening 21 on the dielectric layer 1. For example, the transducer electrodes 31 and the first openings 21 are arranged in a one-to-one correspondence.

The first microstrip lines 32 are arranged on the second surface of the dielectric layer 1, and configured to feed the transducer electrodes 31. The first microstrip lines 32 may be directly electrically connected to the transducer electrodes 31. For example, the first microstrip lines 32 are connected to the transducer electrodes 31 in a one-to-one correspondence. Alternatively, the first microstrip line 32 may also feed the transducer electrode 31 by way of coupling. For example, orthographic projections of the first microstrip line 32 and the transducer electrode 31 on the dielectric layer 1 at least partially overlap with each other. In an embodiment according to the present disclosure, as an example, the first microstrip line 32 and the transducer element 31 are directly connected to each other.

In an embodiment according to the present disclosure, a first opening 21 in the first electrode layer 2, a transducer electrode 31 in the first opening 21, and a first microstrip line 32 connected to the transducer electrode form a transducer unit. For the transducer unit, orthographic projections of the first microstrip line 32 and the first opening 21 on the dielectric layer 1 intersect with each other at a first intersection point P1, and orthographic projections of the first microstrip line 32 and the transducer electrode 31 on the dielectric layer intersect with each other at a second intersection point P2. The first intersection point P1 and the second intersection point P2 are separated by a first distance d1. A maximum distance of the first opening along the normal direction through the first intersection point P1 is a second distance d2, the first distance d1 is less than or equal to half of the second distance d2, i.e., the distance between the first intersection point P1 and the second intersection point P2 is small, that is, the distance between the first opening 21 and the transducer electrode 31 at a feeding end of the first microstrip line 32 is small, which helps to expand the bandwidth of the transducer unit, thereby realizing a high-bandwidth micro-wave transducer. In addition, for the first opening 21 in the first electrode layer 2, at a high frequency band of the ultra wide band, the transducer electrode 31 serves as the main radiation source, and has a structural prototype equivalent to a monopole micro-wave transducer. At a low frequency band, the transducer electrode 31 and the first opening 21 increase the capacitive characteristic of the micro-wave transducer. Experiments prove that the micro-wave transducer provided in an embodiment according to the present disclosure operates in a 5G Sub-6 GHz frequency band (a frequency band of less than 6 GHz in 5G), may be attached to a window, and is connected with an indoor CPE (Customer Premise Equipment) through a low-loss cable, so that the space loss is reduced, and the internet experience of a user is improved to a certain extent.

In some examples, a ratio of an area of an orthographic projection of the first opening 21 on the dielectric layer to an area of an orthographic projection of the transducer electrode 31 in one transducer unit on the dielectric layer is 0.017 to 0.67. In an embodiment according to the present disclosure, the areas of the first opening 21 and the transducer electrode 31 are reasonably set, thereby ensuring a width of a slit between the first opening 21 and the transducer electrode 31, and further expanding the operating bandwidth of the micro-wave transducer.

In some examples, in each of at least some of the transducer units, a center of the orthographic projection of the transducer electrode 31 on the dielectric layer 1, a center of the orthographic projection of the first opening 21 on the dielectric layer 1, and the first intersection point P1 are on a same straight line. That is, for one transducer unit, the first opening 21 and the transducer element 31 have the same symmetry axis, so that impedance matching may be performed well and radiation efficiency of micro-wave signals may be improved. In an embodiment according to the present disclosure, as an example, in each transducer unit, the center of the orthographic projection of the transducer electrode 31 on the dielectric layer 1, the center of the orthographic projection of the first opening 21 on the dielectric layer 1, and the first intersection point P1 are on a same straight line.

In some examples, the first opening 21 in the first electrode layer 2 includes a first side 101, and a third side 103 and a fourth side 104 connected to the first side 101. For example, a shape of the first opening 21 is triangular. Meanwhile, the transducer element 31 includes a second side 102, and a fifth side 105 and a sixth side 106 connected to the second side 102. For example, a shape of the transducer element 31 is triangular. In each of at least some of the transducer units, a distance between orthographic projections of the third side 103 and the fifth side 105 on the dielectric layer is a third distance d3, and a distance between orthographic projections of the fourth side 104 and the sixth side 106 on the dielectric layer is a fourth distance d4. At least one of the third distance d3 and the fourth distance d4 is greater than or equal to the first distance d1. For example, the third distance d3 and the fourth distance d4 are both greater than or equal to the first distance d1, i.e., the distance between the first opening 21 and the transducer electrode 31 at the feeding end of the first microstrip line is small, which helps to expand the bandwidth of the transducer unit, thereby realizing a high-bandwidth micro-wave transducer. In some examples, a ratio of a thickness of the dielectric layer 1 to a thickness of the transducer electrode 31 is 20 to 450. By selecting the appropriate thickness ratio of the dielectric layer 1 to the transducer electrode 31, the radiation performance of the micro-wave transducer may be improved.

In some examples, as shown in FIG. 1, the dielectric layer 1 in the micro-wave transducer includes, but is not limited to, flexible materials. For example, the dielectric layer 1 is made of Polyimide (PI). Alternatively, the dielectric layer 1 may also be made of glass-based materials. In some examples, when the dielectric layer 1 is made of PI materials, its thickness is about 0.2 mm, and its Dk/Df is about 3.2/0.004. When the dielectric layer 1 is a PI substrate, the transducer electrode 31 is arranged on the upper surface of the PI substrate, and meanwhile, a protective layer 4, such as a self-repairing transparent waterproof coating, is further formed on a side of the transducer electrodes 31 away from the PI substrate, to protect the transducer electrodes 31.

Figure 4:
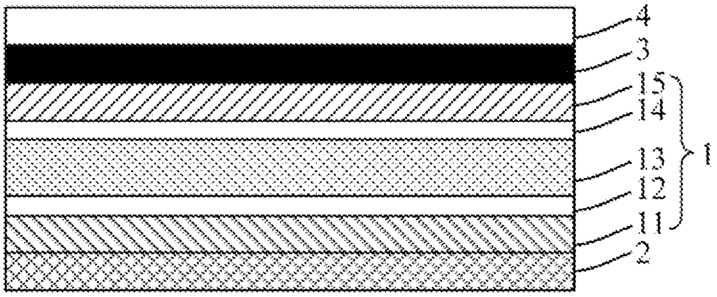
FIG. 4 is a cross-sectional view of another micro-wave transducer in an embodiment according to the present disclosure.

In some examples, FIG. 4 is a cross-sectional view of another micro-wave transducer in an embodiment according to the present disclosure; as shown in FIG. 4, the dielectric layer 1 in the micro-wave transducer is a composite film layer, and includes a first dielectric sub-layer 11, a first adhesive layer 12, a second dielectric sub-layer 13, a second adhesive layer 14, and a third dielectric sub-layer 15, which are sequentially stacked. The first electrode layer 2 is arranged on a side of the first dielectric sub-layer 11 away from the first adhesive layer 12, i.e., the side of the first dielectric sub-layer 11 away from the first adhesive layer 12 serves as the first surface of the dielectric layer 1. The transducer electrodes 31 are arranged on a side of the third dielectric sub-layer 15 away from the second adhesive layer 14, i.e., the side of the second dielectric sub-layer 13 away from the second adhesive layer 14 serves as the second surface of the dielectric layer 1. In this case, the transducer elements 31 and the first microstrip lines 32 are arranged on the upper surface of the third dielectric sub-layer 15, and then a connector may be soldered directly on the third dielectric sub-layer 15 to provide the micro-wave signals for the first microstrip lines 32. The first electrode layer 2 is arranged on the lower surface of the first dielectric sub-layer 11, which facilitates to provide a ground voltage to the first electrode layer 2. In some examples, the first dielectric sub-layer 11 and the third dielectric sub-layer 15 include, but are not limited to, PI materials; the second dielectric sub-layer 13 includes, but is not limited to, polyethylene terephthalate (PET). The materials of the first adhesive layer 12 and the second adhesive layer 14 may be transparent optically clear adhesive (OCA). When the transducer electrodes 31 are arranged on the side of the third dielectric sub-layer 15 away from the second adhesive layer 14, the protective layer 4, such as the self-repairing transparent waterproof coating, is further formed on the side of the transducer electrodes 31 away from the third dielectric sub-layer 15, to protect the transducer electrodes 31.

Figure 5:
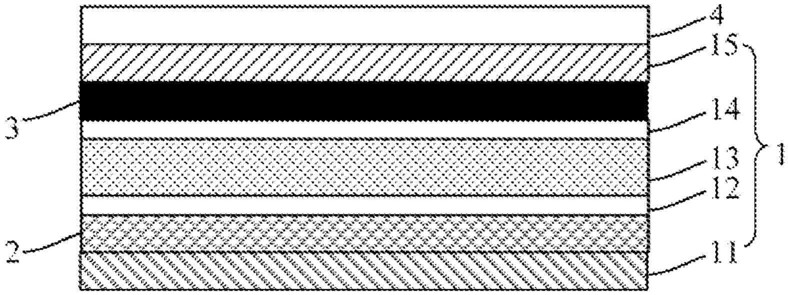
FIG. 5 is a cross-sectional view of another micro-wave transducer in an embodiment according to the present disclosure.

In some examples, FIG. 5 is a cross-sectional view of another micro-wave transducer in an embodiment according to the present disclosure; as shown in FIG. 5, the dielectric layer 1 in the micro-wave transducer has the same structure as the dielectric layer 1 in the micro-wave transducer shown in FIG. 3, and includes the first dielectric sub-layer 11, the first adhesive layer 12, the second dielectric sub-layer 13, the second adhesive layer 14, and the third dielectric sub-layer 15, which are sequentially stacked. The first electrode layer 2 is arranged on a side of the first dielectric sub-layer 11 close to the first adhesive layer 12, i.e., the side of the first dielectric sub-layer 11 close to the first adhesive layer 12 serves as the first surface of the dielectric layer 1. The transducer electrodes 31 are arranged on a side of the second dielectric sub-layer 13 close to the second adhesive layer 14, i.e., the side of the second dielectric sub-layer 13 close to the second adhesive layer 14 serves as the second surface of the dielectric layer 1. In this case, the first microstrip lines, the transducer elements and the first electrode layer are not exposed to the outside, so that water and oxygen corrosion may be effectively prevented. In some examples, the first dielectric sub-layer 11 and the third dielectric sub-layer 15 include, but are not limited to, PI materials; the second dielectric sub-layer 13 includes, but is not limited to, polyethylene terephthalate (PET). The materials of the first adhesive layer 12 and the second adhesive layer 14 may be transparent optically clear adhesive (OCA). When the transducer electrodes 31 are arranged between the third dielectric sub-layer 15 and the second adhesive layer 14, the protective layer 4, such as the self-repairing transparent waterproof coating, is further formed on the upper surface of the third dielectric sub-layer 15, to protect the third dielectric sub-layer 15.

As shown in FIGS. 4 and 5, when the dielectric layer 1 includes the first dielectric sub-layer 11, the first adhesive layer 12, the second dielectric sub-layer 13, the second adhesive layer 14, and the third dielectric sub-layer 15, which are sequentially stacked. The first dielectric sub-layer 11 and the third dielectric sub-layer 15 may be made of the same material, and thicknesses of the first dielectric sub-layer 11 and the third dielectric sub-layer 15 are the same or substantially the same. The second dielectric sub-layer 13 is different from the first dielectric sub-layer 11 (or the third dielectric sub-layer 15) in material and thickness, and a thickness of the second dielectric sub-layer 13 is greater than that of the first dielectric sub-layer 11. The thickness of the first dielectric sub-layer 11 (or the third dielectric sub-layer 15) is about 10 μm to 80 μm, and the thickness of the second dielectric sub-layer 13 is about 0.2 mm to 0.7 mm.

Figure 6:
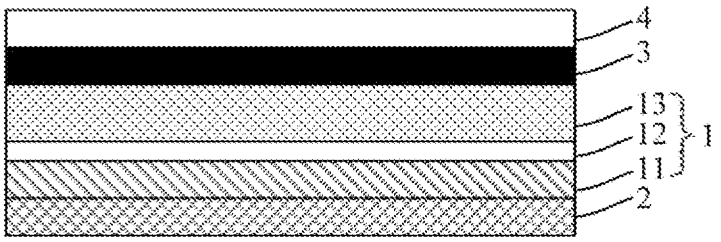
FIG. 6 is a cross-sectional view of another micro-wave transducer in an embodiment according to the present disclosure.

In some examples, FIG. 6 is a cross-sectional view of another micro-wave transducer in an embodiment according to the present disclosure; as shown in FIG. 5, the dielectric layer 1 in the micro-wave transducer includes the first dielectric sub-layer 11, the first adhesive layer 12, and the second dielectric sub-layer 13, which are stacked. A surface of the first dielectric sub-layer 11 away from the first adhesive layer 12 serves as the first surface of the dielectric layer 1, i.e., the first electrode layer 2 is arranged on a side of the first dielectric sub-layer away from the first adhesive layer 12. The surface of the second dielectric sub-layer 13 away from the first adhesive layer 12 serves as the second surface of the dielectric layer 1, i.e., the transducer electrodes are arranged on the side of the second dielectric sub-layer 13 away from the first adhesive layer 12. The material of the first dielectric sub-layer 11 includes polyimide, and the material of the second dielectric sub-layer 13 includes polyethylene terephthalate; alternatively, the material of the first dielectric sub-layer 11 includes polyethylene terephthalate, and the material of the second dielectric sub-layer 13 includes polyimide.

In some examples, the micro-wave transducer includes not only the above-described dielectric layer 1, the first electrode layer 2, the transducer electrodes 31 and the first microstrip lines 32, but also the feeding unit 5. The feeding unit 5 may be arranged on the second surface of the dielectric layer 1; and an orthographic projection of the feeding unit 5 on the dielectric layer 1 at least partially overlap with an orthographic projection of the first microstrip lines 32 on the dielectric layer 1; and the feeding unit 5 is configured to feed the first microstrip lines 32.

In some examples, when the number of the first openings 21 is $2^n$, and shapes and sizes of at least two first openings are the same, the feeding unit 5 may include n stages of second microstrip lines 51. One of the second microstrip lines 51 at the 1st stage is connected to two adjacent first microstrip lines 32, and the first microstrip lines 32 connected to different second microstrip lines 51 at the 1st stage are different. One of the second microstrip lines 51 at the $m^{th}$ stage is connected to two adjacent second microstrip lines 51 at the $(m-1)^{th}$ stage, and the second microstrip lines 51 at the $(m-1)^{th}$ stage connected to different second microstrip lines 51 at the $m^{th}$ stage are different, wherein n is greater than or equal to 2, m is greater than or equal to 2 and less than or equal to n, and both m and n are integers.

It should be noted that, in the embodiment according to the present disclosure, as an example, the first microstrip line 32 is directly connected to the second microstrip line 51 of the feeding unit 5. In this case, the first microstrip line 32 and the second microstrip line 51 may be arranged in the same layer and be made of the same material. Meanwhile, the transducer electrodes 31 may also be directly connected to the first microstrip lines 32, so that the transducer electrodes 31, the first microstrip lines 32, and the second microstrip lines 51 may be arranged in the same layer and be made of the same material, i.e., they may be formed in a same patterning process, thereby reducing the process cost and improving the production efficiency. Alternatively, in the embodiment according to the present disclosure, the first microstrip lines 32 and the feeding unit 5 are arranged in different layers, as long as orthographic projections of the first microstrip line 32 and the second microstrip line 51 at the 1st stage on the dielectric layer 1 overlap with each other. For example, when the dielectric layer 1 includes the first dielectric sub-layer 11, the first adhesive layer 12, the second dielectric sub-layer 13, the second adhesive layer 14, and the third dielectric sub-layer 15, which are sequentially stacked, the first microstrip lines 32 are arranged on a side of the second dielectric sub-layer 13 away from the first dielectric sub-layer 11, the second microstrip lines 51 are arranged on a side of the second dielectric sub-layer 13 close to the first dielectric sub-layer 11, and orthographic projections of the first microstrip line 32 and the corresponding second microstrip line 51 on the first dielectric sub-layer 11 are overlapped. At this time, the second microstrip line 51 of the feeding unit 5 may feed the first microstrip line 32 by way of coupling.

In some examples, the first opening 21 in the first electrode layer 2 includes, but is not limited to, an arc shape or a triangular shape. Alternatively, the first opening 21 in the first electrode layer 2 may also be circular, rectangular, etc. Accordingly, the shape of the transducer electrode 31 may be adapted to the shape of the first opening 21, i.e., the shape of the transducer electrode 31 is the same as the shape of the first opening 21. Alternatively, the shape of the transducer electrode 31 may be different from the shape of the first opening 21, for example, the transducer electrode 31 has a triangular shape and the first opening 21 has a rectangular shape. It should be noted that the shapes of the first opening 21 and the transducer electrode 31 are not limited in the embodiment according to the present disclosure as long as the orthographic projection of the transducer electrode 31 on the dielectric layer 1 is within the orthographic projection of the first opening 21 on the dielectric layer 1.

The structure of the first opening 21 in the first electrode layer 2 and the transducer electrode 31 in the embodiment according to the present disclosure is explained below with reference to specific examples.

Figure 7:
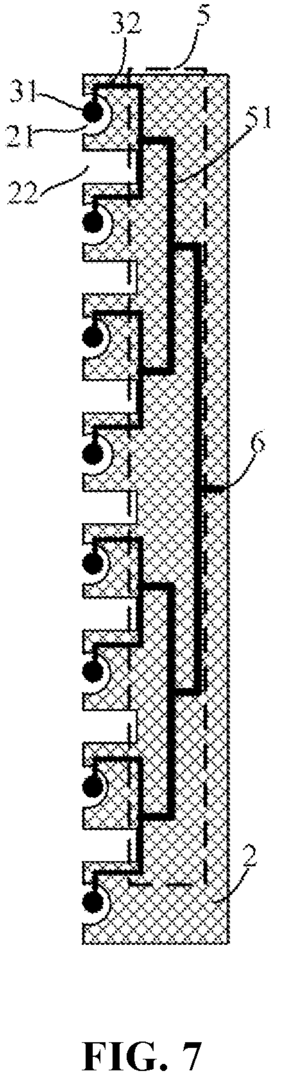
FIG. 7 is a top view of another micro-wave transducer in an embodiment according to the present disclosure.

In one example, as shown in FIG. 7, the first openings 21 in the first electrode layer 2 are an arc-shaped first opening 21 and are on one side of the first electrode layer 2 in the length direction, and the transducer electrodes 31 adopt a circular transducer electrode 31. In FIG. 2, as an example, the number of the first openings 21 in the first electrode layer 2 is 8, and the transducer electrodes 31 are arranged in one-to-one correspondence with the first openings 21. In this case, one transducer electrode 31 is connected to one first microstrip line 32, i.e., there are 8 first microstrip lines 32. The feeding unit 5 includes 3 stages of second microstrip lines 51, wherein each of the second microstrip lines 51 at the 1st stage is connected to two adjacent first microstrip lines 32, and the first transmission lines connected to different second microstrip lines 51 at the 1st stage are different. For example, from top to bottom, the 1st second microstrip line 51 at the 1st stage is connected to the first microstrip lines 32 to which the 1st and 2nd transducer electrodes 31 are connected; the 2nd second microstrip line 51 is connected to the first microstrip lines 32 to which the 3rd and the 4th transducer electrodes 31 are connected; the 3rd second microstrip line 51 is connected to the first microstrip lines 32 to which the 5th and the 6th transducer electrodes 31 are connected; the 4th second microstrip line 51 is connected to the first microstrip lines 32 to which the 7th and the 8th transducer electrodes 31 are connected. Each of the second microstrip lines 51 at the 2nd stage is connected to two adjacent second microstrip lines 51 at the 1st stage, and the second microstrip lines 51 at the 1st stage connected to different second microstrip lines 51 at the 2nd stage are different. For example, from top to bottom, the 1st second microstrip line 51 at the 2nd stage is connected to the 1st and 2nd second microstrip lines 51 at the 1st stage; the 2nd second microstrip line 51 of the 2nd stage is connected to the 3rd and 4th second microstrip lines 51 at the 1st stage. The second microstrip line 51 at the 3rd stage is connected to the two second microstrip lines 51 at the 2nd stage. Alternatively, the feeding unit 5 includes not only the second microstrip lines 51 but also the transformer 6, and the transformer 6 is connected to the second microstrip line 51 at nth stage.

Here, it should be noted that, in the above description, the first openings 21 are provided only on one side of the first electrode layer 2 in the length direction as an example. In an actual product, the first openings 21 may be provided on both sides of the first electrode layer 2 in the length direction. For example, the two sides of the first electrode layer 2 in the length direction are provided with 8 first openings 21, respectively; and the transducer electrode 31 is arranged at a position corresponding to each first opening 21, and at this time, the first electrode layer 2 is mirror-symmetrical with respect to a perpendicular bisector of a wide side thereof. In this case, the feeding units 5 for the transducer electrodes 31 on both sides of the first electrode layer 2 in the length direction are the same, and two second microstrip lines 51 at the nth stage may be connected to one three-port transformer 6 to implement the feeding function.

With continued reference to FIG. 7, the first electrode layer 2 includes not only the first openings 21 but also auxiliary third openings 22 each of which is between the any two first openings 21 adjacently arranged. The third opening 22 includes, but is not limited to, a rectangular opening. In the embodiment according to the present disclosure, a radiation direction of the micro-wave signal may be adjusted through the third openings, and meanwhile, the optical transmittance of the micro-wave transducer is increased, and the visual effect is improved.

With continued reference to FIG. 7, a distance exists between orthographic projections of a center of any first opening 21 in the first electrode layer 2 and a center of the corresponding transducer electrode 31 on the dielectric layer 1, i.e., the centers of the first opening 21 and the corresponding transducer electrode 31 are offset from each other, which facilitate to realize optimal impedance matching.

With continued reference to FIG. 7, the first microstrip line 32 may adopt an L-shaped structure, which includes a first portion and a second portion electrically connected to each other; and the first portion is connected to the transducer electrode 31; the second portion is connected to the feeding unit 5 (for example, connected to the second microstrip line 51 at 1st stage); and an extending direction of the first portion is perpendicular to an extending direction of the second portion. A corner, where the first and second portions are connected to each other, may be rounded or flat chamfers. The corner, where the first and second portions are connected to each other, is preferably a non-right angle, so that the micro-wave signal is prevented from being reflected at the position, and the transmission loss of the micro-wave signal is prevented from being increased.

In some examples, the first microstrip line 32 is a 50Ω microstrip line, i.e., an impedance of the first microstrip line 32 is around 50Ω. Alternatively, a microstrip line with corresponding impedance may also be selected as the first microstrip line 32, according to the parameter requirement on the gain of the micro-wave transducer.

In some examples, an arc of the first opening 21 is around 200° to 300°, and may be 250°, for example. The first opening 21 has a chord length of about 20 mm to 25 mm, for example, 22.7 mm. In an embodiment according to the present disclosure, an extending direction of the chord of the first opening 21 is parallel to the length direction of the first electrode layer 2. In this case, if the third openings 22 are provided between the adjacent first openings 21, a depth and a width of the third opening 22 are both about 20 mm to 30 mm. For example, the depth and width of the third opening 22 are both 25 mm. By reasonably setting the depth and width of the third opening, the optical transmittance of the micro-wave transducer may be effectively improved.

Figure 8:
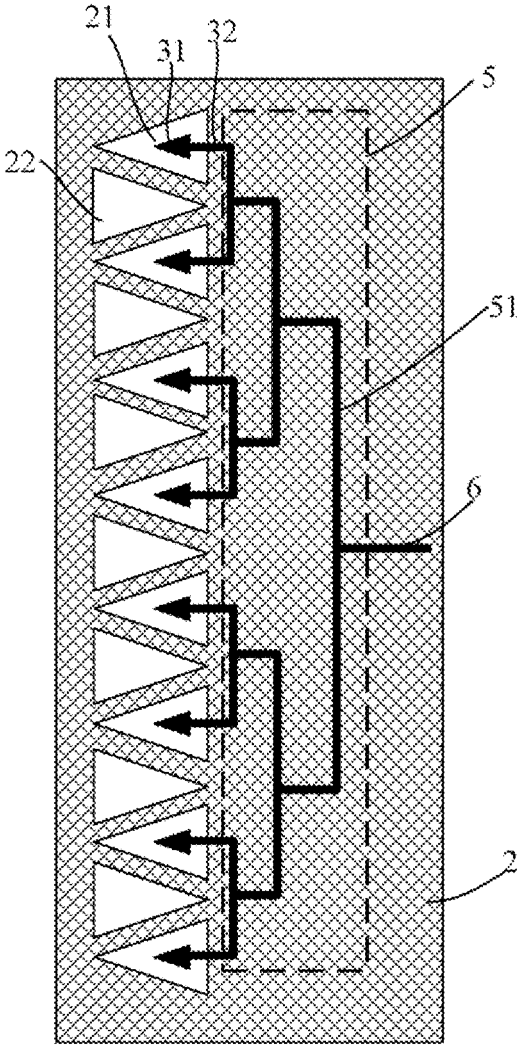
FIG. 8 is a top view of another micro-wave transducer in an embodiment according to the present disclosure.

In another example, FIG. 8 is a top view of another micro-wave transducer in an embodiment according to the present disclosure; as shown in FIG. 8, the first openings 21 of the micro-wave transducer are formed in the first electrode layer 2, and the first openings 21 and the transducer electrodes 31 both adopt a triangle shape, i.e., the transducer electrode 31 is a triangle-shaped sheet structure, each transducer electrode 31 is connected to a first microstrip line 32. The feeding unit 5 is the same as the feeding unit 5 shown in FIG. 2, and therefore, the details are not repeated here. The first electrode layer 2 in the embodiment according to the present disclosure is further provided with third openings 22, each of which may be between the two first openings 21. In the embodiment according to the present disclosure, the radiation direction of the micro-wave signal may be adjusted through the third openings, and meanwhile, the optical transmittance of the micro-wave transducer is increased, and the visual effect is improved. In an embodiment according to the present disclosure, when the first opening 21 is triangular, the third opening 22 may also be triangular, and the third opening 22 is equivalent to the first opening 21 rotated by 180°.

Figure 9:
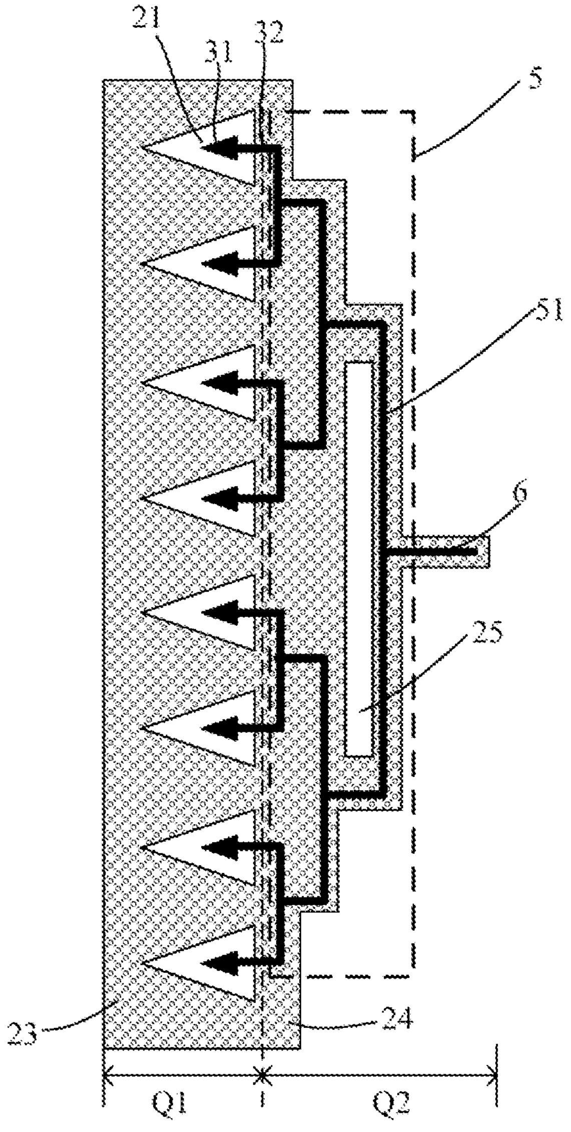
FIG. 9 is a top view of another micro-wave transducer in an embodiment according to the present disclosure.

In another example, FIG. 9 is a top view of another micro-wave transducer in an embodiment according to the present disclosure; as shown in FIG. 9, the micro-wave transducer includes a transducing region Q1 and a feeding region Q2; wherein the transducer electrodes 31 and the first openings 21 in the first electrode layer 2 are both arranged in the transducing region Q1, and the feeding unit 5 is arranged in the feeding region Q2. The structure of the micro-wave transducer is substantially similar to that of the micro-wave transducer shown in FIG. 8, the transducer electrode 31 and the first opening 21 in the first electrode layer 2 both have a triangular shape, i.e., the transducer electrode 31 has a triangle-shaped sheet structure. The difference between the micro-wave transducers shown in FIGS. 8 and 9 lies in the first electrode layer 2, specifically, the first electrode layer 2 of the micro-wave transducer shown in FIG. 9 includes a first sub-electrode 23 in the transducing region Q1 and a second sub-electrode 24 in the feeding region Q2; an orthographic projection of the second sub-electrode 24 on the dielectric layer 1 covers an orthographic projection of the feeding unit 5 on the dielectric layer 1. For example, an outline of the second sub-electrode 24 is the same as an outline of the feeding unit 5. It should be understood that, even so, the orthographic projection of the first electrode layer 2 on the dielectric layer 1 covers the orthographic projection of the feeding unit 5 on the dielectric layer 1.

With continued reference to FIG. 9, in some examples, the first electrode layer includes not only the first openings 21 in the transducing region, but also a second opening 25 in the feeding region Q2, and an orthographic projection of the second opening 25 on the dielectric layer 1 does not overlap with the orthographic projection of the feeding unit 5 on the dielectric layer 1. The second opening 25 is provided, which not only improves the optical transmittance of the micro-wave transducer, but also changes the radiation direction of the micro-wave signal.

For example, when the number of the first openings 21 of the first electrode layer 2 is $2^n$, the feeding unit 5 includes n stages of second microstrip lines 51, at this time, the second opening 25 is arranged on a side of at least some of the second microstrip lines 51 close to the transducing region Q1. For example, in FIG. 7, the second opening 25 is provided on the left of the second microstrip line 51 at the 1st stage.

Figure 10:
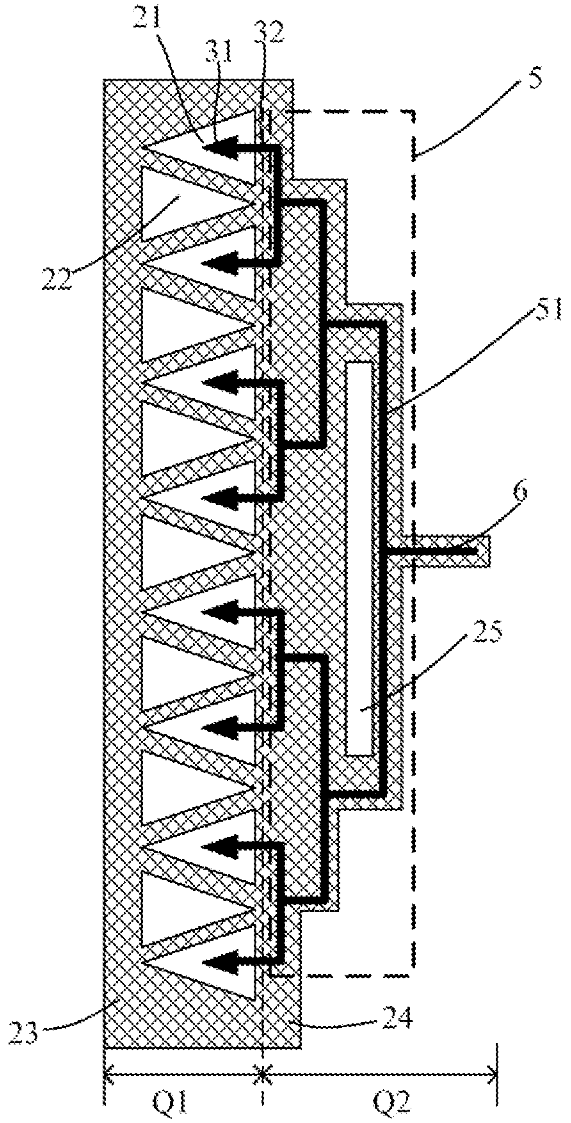
FIG. 10 is a top view of another micro-wave transducer in an embodiment according to the present disclosure.

Further, FIG. 10 is a top view of another micro-wave transducer in an embodiment according to the present disclosure; as shown in FIG. 10, the first sub-electrode 23 in the embodiment according to the present disclosure is further provided with third openings 22, each of which may be between the two first openings 21. In the embodiment according to the present disclosure, the radiation direction of the micro-wave signal may be adjusted through the third openings, and meanwhile, the optical transmittance of the micro-wave transducer is increased, and the visual effect is improved. In an embodiment according to the present disclosure, when the first opening 21 is triangular, the third opening 22 may also be triangular, and the third opening 22 is equivalent to the first opening 21 rotated by 180°.

Figure 11:
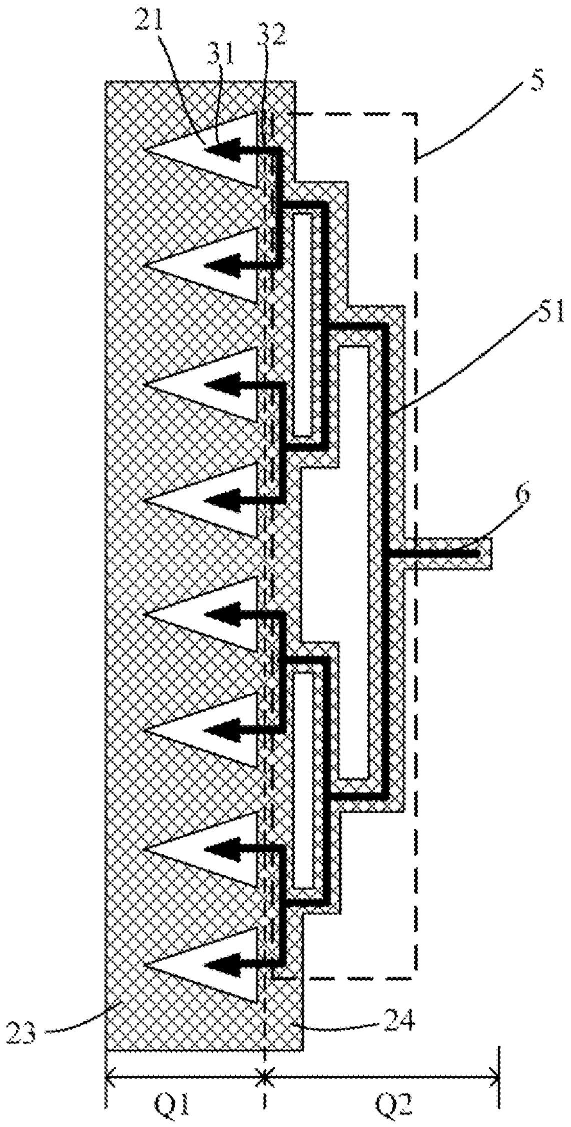
FIG. 11 is a top view of another micro-wave transducer in an embodiment according to the present disclosure.

In another example, FIG. 11 is a top view of another micro-wave transducer in an embodiment according to the present disclosure; as shown in FIG. 11, the structure of the micro-wave transducer is substantially the same as that of the micro-wave transducer shown in FIG. 7, except for the first electrode layer 2. Specifically, the second sub-electrode 24 in the first electrode layer 2 has the same pattern as the feeding unit 5. For example, the feeding unit 5 includes second microstrip lines 51, at this time, the pattern of the second sub-electrode 24 corresponds to the second microstrip line 51, i.e., except for the pattern of the second sub-electrode 24 in the first electrode layer 2 at the position corresponding to the feeding unit 5, the pattern at the remaining positions are hollowed out, that is, the second openings 25 are provided at positions of the second sub-electrode except for the position corresponding to the feeding unit 5=. The other structures of the micro-wave transducer are the same as those of the micro-wave transducer shown in FIG. 8, and therefore, the details are not repeated here.

Figure 12:
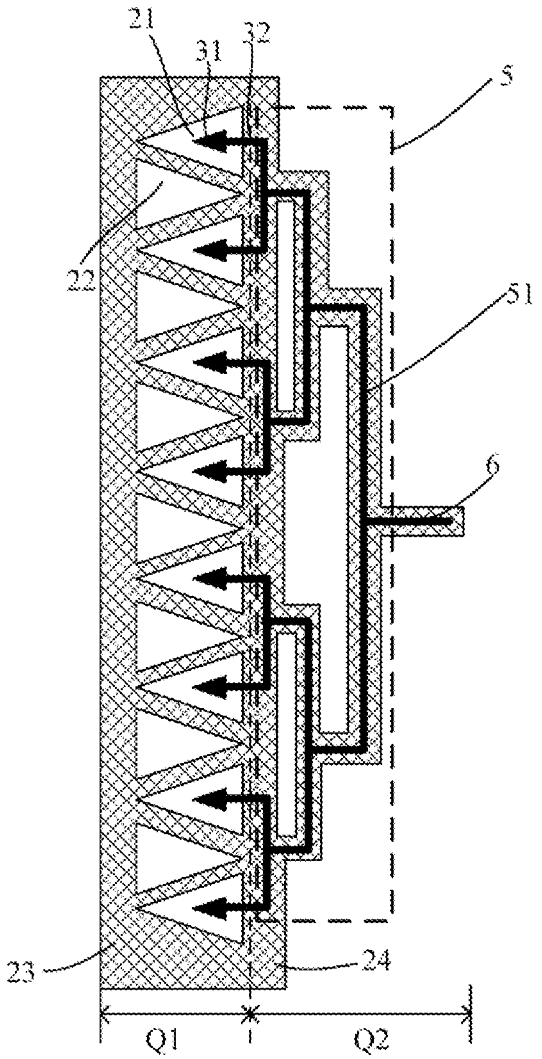
FIG. 12 is a top view of another micro-wave transducer in an embodiment according to the present disclosure.

FIG. 12 is a top view of another micro-wave transducer in an embodiment according to the present disclosure; as shown in FIG. 12, the first sub-electrode 23 in the embodiment according to the present disclosure is further provided with third openings 22, each of which may be between the two first openings 21. In the embodiment according to the present disclosure, the radiation direction of the micro-wave signal may be adjusted through the third opening, and meanwhile, the optical transmittance of the micro-wave transducer is increased, and the visual effect is improved. In an embodiment according to the present disclosure, when the first opening 21 is triangular, the third opening 22 may also be triangular, and the third opening 22 is equivalent to the first opening 21 rotated by 180°.

In some examples, the total area of the third openings 22 in the first sub-electrode 23 is less than the total area of the second openings 25 in the second sub-electrode 24. In an embodiment according to the present disclosure, through the cooperation of the second opening 25 and the third opening 25, the radiation direction is adjusted, and further, the optical transmittance of the micro-wave transducer may be increased, and the visual effect may be improved.

In some examples, with continued reference to FIGS. 11 and 12, an orthographic projection of the second sub-electrode 24 on the dielectric layer 1 covers an orthographic projection of the second microstrip line 51 on the dielectric layer 1; and at the same position of the dielectric layer 1, a line width of the orthographic projection of the second microstrip line 51 is less than or equal to 0.5 times a width of the orthographic projection of the second sub-electrode 24. Therefore, the second microstrip line 51 may be fully covered by the second sub-electrode 24, so as to reduce the loss caused by the outward radiation of the micro-wave signal.

In some examples, an orthographic projection of the the second microstrip line 51 at at least one stage on the dielectric layer 1 divides the orthographic projection of the second sub-electrode 24 on the dielectric layer 1 into two parts with unequal areas. That is, areas of orthographic projections of the second sub-electrode 24 on the dielectric layer 1, on the left and right sides of the second microstrip line 51 are different.

Figure 13:
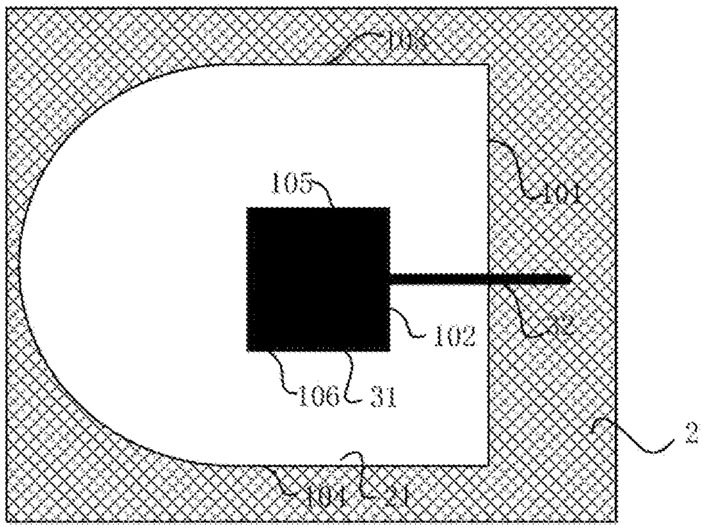
FIG. 13 is a schematic diagram of another transducer unit in an embodiment according to the present disclosure.

It should be noted that, in the above description, as an example, the first opening 21 and the transducer element 31 have the same shape, but actually, shapes of the first opening 21 and the transducer element 31 may also be different, such as the transducer unit shown in FIG. 13. In this case, the first opening 21 may be an opening formed by splicing and combining a semicircular opening and a rectangular opening. In some examples, the materials of the first electrode layer 2, the first microstrip line 32, the second microstrip line 51, and the transducer electrode 31 described above all include, but are not limited to, aluminum or copper.

Through experimental verification, factors influencing the performance of the micro-wave transducer mainly include the material and the dielectric constant/loss tangent (Dk/Df) of the dielectric layer 1, the materials and the thicknesses of the first electrode layer 2 and the transducer electrode 31, and the like, and are described below with reference to specific examples, wherein a center frequency of the micro-wave transducer is 3.75 GHz.

In a first example, a cross-sectional view of the micro-wave transducer is shown in FIG. 5, a top view of the micro-wave transducer is shown in FIG. 8. The dielectric layer 1 of the micro-wave transducer includes the first dielectric sub-layer 11, the first adhesive layer 12, the second dielectric sub-layer 13, the second adhesive layer 14, and the third dielectric sub-layer 15, which are sequentially stacked; transducer electrodes 31, first microstrip lines 32, and the feeding unit 5 are arranged between the third dielectric sub-layer 15 and the second adhesive layer 14; and the first electrode layer 2 is arranged between the first dielectric sub-layer 11 and the first adhesive layer 12. The first dielectric sub-layer 11 and the third dielectric sub-layer 15 adopt PI substrates with a thickness of 34 um, and Dk/Df is 3.46/0.0015. The second dielectric sub-layer 13 adopts a PET substrate with a thickness of 0.5 mm, and Dk/Df is 3.9/0.003. The first electrode layer 2 adopts aluminum material with a thickness of 0.6 um, and an arc-shaped groove is formed in the first electrode layer 2. The transducer electrode 31 adopts aluminum material with a thickness of 1.2 um, and the transducer electrode 31 adopts a circular radiation patch. The first adhesive layer 12 and the second adhesive layer 14 adopt the OCA with a thickness of 5 um. The overall size of the micro-wave transducer is 62.4 mm*375 mm. It is realized through a simulation for the above structure that the −6 dB impedance bandwidth of the micro-wave transducer is 0.61 GHz and 0.65 GHz (3.20 GHz to 3.81 GHz, 3.85 GHz to 4.5 GHz); the gain of the micro-wave transducer is 7.45 dBi; the half-power beam width is 10°/203°; and the radiation efficiency of the micro-wave transducer is 64.3%.

In a second example, a cross-sectional view of the micro-wave transducer is shown in FIG. 4, a top view of the micro-wave transducer is shown in FIG. 8. The dielectric layer 1 of the micro-wave transducer includes the first dielectric sub-layer 11, the first adhesive layer 12, the second dielectric sub-layer 13, the second adhesive layer 14 and the third dielectric sub-layer 15, which are sequentially stacked; transducer electrodes 31, first microstrip lines 32 and the feeding unit 5 are arranged between the third dielectric sub-layer 15 and the second adhesive layer 14; and the first electrode layer 2 is arranged between the first dielectric sub-layer 11 and the first adhesive layer 12. The first dielectric sub-layer 11 and the third dielectric sub-layer 15 adopt PI substrates with a thickness of 60 um, and Dk/Df is 4.72/0.0047. The second dielectric sub-layer 13 adopts a PET substrate with a thickness of 0.5 mm, and Dk/Df is 2.77/0.0059. The first electrode layer 2 adopts aluminum material with a thickness of 1.2 um, and a triangular groove is formed in the first electrode layer 2. The transducer electrode 31 adopts aluminum material with a thickness of 1.2 um, and the transducer electrode 31 adopts a triangular sheet structure. Both the first adhesive layer 12 and the second adhesive layer 14 adopt the OCA with a thickness of 5 um. The overall size of the micro-wave transducer is 100.98 mm*320 mm. It is realized through a simulation for the above structure that the −6 dB impedance bandwidth of the micro-wave transducer is 1.37 GHz (3.13 GHz to 4.5 GHz); the gain of the micro-wave transducer is 7.59 dBi; the half-power beam width is 12°/47°; and the radiation efficiency of the micro-wave transducer is 73.4%.

In a third example, a cross-sectional view of the micro-wave transducer is shown in FIG. 4, a top view of the micro-wave transducer is shown in FIG. 9. The dielectric layer 1 of the micro-wave transducer includes the first dielectric sub-layer 11, the first adhesive layer 12, the second dielectric sub-layer 13, the second adhesive layer 14, and the third dielectric sub-layer 15, which are sequentially stacked; transducer electrodes 31, first microstrip lines 32, and the feeding unit 5 are arranged between the third dielectric sub-layer 15 and the second adhesive layer 14; and the first electrode layer 2 is arranged between the first dielectric sub-layer 11 and the first adhesive layer 12. Portions of the micro-wave transducer which are same as those of the second example are not described again. The difference between them lies in that the micro-wave transducer includes the first sub-electrode 23 in the transducing region Q1 and the second sub-electrode 24 in the feeding region Q2 in the first electrode layer 2; triangular first openings 21 are formed in the first sub-electrode 23; the profile of the second sub-electrode 24 on a side away from the first sub-electrode 23 is matched with the profile of the feeding unit 5, and a hollow pattern is arranged on a side of at least some of the second microstrip lines 51 close to the transducing region Q1. For example, in FIG. 6, a hollow opening pattern is arranged on the left side of the second microstrip line 51 at the 1st stage. This design of the first opening 21 may further improve the gain of the micro-wave transducer array. The overall size of the micro-wave transducer is still 100.98 mm*320 mm. It is realized through a simulation for the above structure that the −6 dB impedance bandwidth of the micro-wave transducer is 1.37 GHz (3.13 GHz to 4.5 GHz); the gain of the micro-wave transducer is 10.74 dBi; the half-power beam width is 12°/61°; and the radiation efficiency of the micro-wave transducer is 73.2%.

In a fourth example, a cross-sectional view of the micro-wave transducer is shown in FIG. 3, a top view of the micro-wave transducer is shown in FIG. 9. The dielectric layer 1 of the micro-wave transducer includes the first dielectric sub-layer 11, the first adhesive layer 12, the second dielectric sub-layer 13, the second adhesive layer 14, and the third dielectric sub-layer 15, which are sequentially stacked; transducer electrodes 31, first microstrip lines 32, and the feeding unit 5 are arranged on a side of the third dielectric sub-layer 15 away from the second adhesive layer 14; and the first electrode layer 2 is arranged on a side of the first dielectric sub-layer 11 away from the first adhesive layer 12. Compared with the third example, in the micro-wave transducer, only the positions of the transducer electrodes 31 and the first electrode layers 2 are changed, and the remaining film layers remain unchanged, and therefore, the details are not repeated here. The overall size of the micro-wave transducer is 98.93 mm*320 mm. It is realized through a simulation for the above structure that the −6 dB impedance bandwidth of the micro-wave transducer is 1.33 GHz (3.17 GHz to 4.5 GHz); the gain of the micro-wave transducer is 10.40 dBi; the half-power beam width is 12°/59°; and the radiation efficiency of the micro-wave transducer is 75.7%.

In a fifth example, a cross-sectional view of the micro-wave transducer is shown in FIG. 3, a top view of the micro-wave transducer is shown in FIG. 9. Compared with the fourth example, in the micro-wave transducer, only the array size is changed, and other film layers remain unchanged, and therefore, the details are not repeated here. The overall size of the micro-wave transducer is 97.43 mm*280 mm. It is realized through a simulation for the above structure that the −6 dB impedance bandwidth of the micro-wave transducer is 1.24 GHz (3.26 GHz to 4.5 GHz); the gain of the micro-wave transducer is 9.55 dBi; the half-power beam width is 14°/61°; and the radiation efficiency of the micro-wave transducer is 77.1%.

In a sixth example, a cross-sectional view of the micro-wave transducer is shown in FIG. 3, a top view of the micro-wave transducer is shown in FIG. 11. Compared with the fifth example, in the micro-wave transducer, the thickness and Dk/Df of each of the first dielectric sub-layer 11, the second dielectric sub-layer 13, the third dielectric sub-layer 15, the first adhesive layer 12, and the second adhesive layer 14 are changed, and the pattern of the second sub-electrode 24 in the first electrode layer 2 is changed, and the remaining film layers are the same as in the fifth example, and therefore, the details are not repeated here. The first dielectric sub-layer 11 and the third dielectric sub-layer 15 adopt PI substrates with a thickness of 20 um, and Dk/Df is 4.72/0.0047. The second dielectric sub-layer 13 adopts a PET substrate with a thickness of 0.3 mm, and Dk/Df is 3.25/0.0048. The overall size of the micro-wave transducer is 95.7 mm*280 mm. It is realized through a simulation for the above structure that the −6 dB impedance bandwidth of the micro-wave transducer is 1.39 GHz (3.11 GHz to 4.5 GHz); the gain of the micro-wave transducer is 10.21 dBi; the half-power beam width is 14°/69°; and the radiation efficiency of the micro-wave transducer is 69.7%.

In a seventh example, a cross-sectional view of the micro-wave transducer is shown in FIG. 1, a top view of the micro-wave transducer is shown in FIG. 9. This micro-wave transducer is different from the micro-wave transducers in the second to sixth examples, which only lies in the dielectric layer 1. Specifically, the dielectric layer 1 of the micro-wave transducer is a single-layer PET substrate, and Dk/Df is 3.29/0.0058. The overall size of the micro-wave transducer is 85.1 mm*280 mm. It is realized through a simulation for the above structure that the −6 dB impedance bandwidth of the micro-wave transducer is 1.30 GHz (3.20 GHz to 4.5 GHz); the gain of the micro-wave transducer is 9.82 dBi; the half-power beam width is 14°/83°; and the radiation efficiency of the micro-wave transducer is 65.0%.

In an eighth example, a cross-sectional view of the micro-wave transducer is shown in FIG. 1, a top view of the micro-wave transducer is shown in FIG. 9. This micro-wave transducer is different from the micro-wave transducer in the seventh example, which only lies in the dielectric layer 1, the radiation patch and the first electrode layer 2. Specifically, the dielectric layer 1 of the micro-wave transducer adopts a PI substrate with a thickness of 0.2 mm, and Dk/Df of the PI substrate is 3.2/0.004. Both the radiation patch and the first electrode layer 2 adopt copper with a thickness of 18 um. The overall size of the micro-wave transducer is 86.57 mm*280 mm. It is realized through a simulation for the above structure that the −6 dB impedance bandwidth of the micro-wave transducer is 1.17 GHz (3.33 GHz to 4.5 GHz); the gain of the micro-wave transducer is 10.54 dBi; the half-power beam width is 14°/81°; and the radiation efficiency of the micro-wave transducer is 78.8%.

In a second aspect, an embodiment according to the present disclosure provides a manufacturing method of a micro-wave transducer, which may be used to manufacture any one of the micro-wave transducers described above. The method specifically includes the following steps:

S1, providing a dielectric layer.

The dielectric layer 1 may be a flexible substrate or a glass substrate, and step S1 may include a step of cleaning the dielectric layer 1.

S2, forming a first electrode layer 2 on a first surface of the dielectric layer 1 through a patterning process. First openings 21 are formed in the first electrode layer 2.

In some examples, step S2 may specifically include: depositing a first metal film on the first surface of the dielectric layer 1 by adopting a process including but not limited to magnetron sputtering, then coating photoresist, exposing, developing, and then performing wet etching, and striping off the photoresist after etching, to form a pattern including the first electrode layer 2.

S3, forming a pattern including transducer electrodes 31 and first microstrip lines 32 on a second surface of the dielectric layer 1 through a patterning process. An orthographic projection of one transducer electrode 31 on the dielectric layer 1 is at least partially overlapped with an orthographic projection of the first opening 21 on the dielectric layer 1, and preferably the orthographic projection of one transducer electrode 31 on the dielectric layer 1 is within a range defined by the orthographic projection of the first opening 21 on the dielectric layer 1. Alternatively, in some examples, the transducer electrodes 31 and the first microstrip lines 32 may also be manufactured through two patterning processes.

In some examples, step S3 may specifically include: depositing a second metal film on the first surface of the dielectric layer 1 by adopting a process including but not limited to magnetron sputtering, then coating photoresist, exposing, developing, and then performing wet etching, and striping off the photoresist after etching, to form the pattern including transducer electrodes 31 and first microstrip lines 32.

It should be noted that, the order of the above steps S2 and S3 may be interchanged, i.e., the transducer electrodes 31 and the first microstrip lines 32 may be formed on the second surface of the dielectric layer 1, and then the first electrode layer 2 is formed on the first surface of the dielectric layer 1, both of which are within the protection scope of the embodiment according to the present disclosure.

In some examples, as shown in FIG. 3, the dielectric layer 1 in an embodiment according to the present disclosure includes a first dielectric sub-layer 11, a first adhesive layer 12, a second dielectric sub-layer 13, a second adhesive layer 14, and a third dielectric sub-layer 15, which are sequentially stacked, wherein a surface of the first dielectric sub-layer 11 away from the first adhesive layer 12 serves as the first surface of the dielectric layer 1, a surface of the third dielectric sub-layer 1512 away from the second adhesive layer 14 serves as the second surface of the dielectric layer 1, i.e., the first electrode layer is arranged on a side of the first dielectric sub-layer 11 away from the first adhesive layer 12, and the transducer electrodes 31 and the first microstrip lines 32 are arranged on a side of the third dielectric sub-layer 15 away from the second adhesive layer 14. The manufacturing method in the embodiment according to the present disclosure may also be implemented by the following steps.

S11, providing the first dielectric sub-layer 11.

The first dielectric sub-layer 11 may adopt a PI substrate, and step S11 may include cleaning the first dielectric sub-layer 11.

S12, forming the first electrode layer 2 on the first dielectric sub-layer 11 through a patterning process. First openings 21 are formed on at least one side of the first electrode layer 2.

The step of forming the first electrode layer 2 is the same as step S2, and therefore, the details are not repeated here.

S13, coating the first adhesive layer 12 on a side of the first dielectric sub-layer 11 away from the first electrode layer 2, forming the second dielectric sub-layer 13 on the first adhesive layer 12, then forming the second adhesive layer 14 on a surface of the second dielectric sub-layer 13 away from the first adhesive layer 12, and forming the third dielectric sub-layer 15 on the second adhesive layer 14.

The second dielectric sub-layer 13 may adopt a PET substrate, and the third dielectric sub-layer 15 may adopt a PI substrate. The first adhesive layer 12 and the second adhesive layer 14 may adopt the OCA.

S14, forming the pattern including the transducer electrodes 31 and the first microstrip lines 32 on the third dielectric sub-layer 15 through a patterning process. An orthographic projection of one transducer electrode 31 on the second dielectric sub-layer 13 is within an orthographic projection of the first opening 21 on the dielectric layer 1. Alternatively, in some examples, the transducer electrodes 31 and the first microstrip lines 32 may also be manufactured through two patterning processes.

The steps of forming the transducer electrodes 31 and the first microstrip lines 32 are the same as those of step S3, and therefore, the details are not repeated here.

It should be noted that, in the above description, as an example, steps S11 to S13 precede step S14, but in the actual process, steps S14 may be performed firstly, and then the steps S11 to S13 are performed.

Referring to FIG. 4, the transducer electrodes 31 may also be arranged between the second dielectric sub-layer 13 and the second adhesive layer 14, and the first electrode layer 2 may also be arranged between the first dielectric sub-layer 11 and the first adhesive layer 12. The formation method may be similar to the above method, and therefore, the details are not repeated here.

In addition, in the embodiment according to the present disclosure, the micro-wave transducer includes the dielectric layer 1, the first electrode layer 2, the transducer electrodes 31 and the first microstrip lines 32 formed as described above. The micro-wave transducer may further include the feeding unit 5 formed on the second surface of the dielectric layer 1 and electrically connected to the first microstrip lines 32. If the feeding unit 5 adopts the above feeding network formed by the second microstrip lines 51, the feeding unit 5 composed of the second microstrip lines 51 may be formed while the first microstrip lines 32 and the transducer electrodes 31 are formed.

It will be understood that the above embodiments are merely exemplary embodiments adopted to illustrate the principles of the present invention, and the present invention is not limited thereto. It will be apparent to one of ordinary skill in the art that various modifications and improvements can be made without departing from the spirit and scope of the present invention, and such modifications and improvements are also considered to be within the scope of the present invention.

What is claimed is:

1. A micro-wave transducer, comprising:

a dielectric layer having a first surface and a second surface opposite to each other;

a first electrode layer on the first surface of the dielectric layer and with at least one first opening therein;

at least one transducer electrode on the second surface of the dielectric layer, wherein an orthographic projection of one of the at least one transducer electrode on the dielectric layer is within an orthographic projection of one of the at least one first opening on the dielectric layer; and at least one first microstrip line on the second surface of the dielectric layer, wherein one of the at least one first microstrip line is electrically connected to one of the at least one transducer electrode;

wherein one of the at least one transducer electrode, an orthographic projection of which on the dielectric layer is within an orthographic projection of one of the at least one first opening, the first opening and one of the at least one first microstrip line electrically connected to the transducer electrode forming one transducer unit;

in the transducer unit, an orthographic projection of a first side of the first opening on the dielectric layer and an orthographic projection of the first microstrip line on the dielectric layer intersect at a first intersection point; an orthographic projection of a second side of the transducer electrode on the dielectric layer and an orthographic projection of the first microstrip line on the dielectric layer intersect at a second intersection point; and a distance between the first intersection point and the second intersection point is a first distance; and a distance between an orthographic projection of a center of the first opening on the dielectric layer and the first intersection point is a second distance, and the first distance is less than or equal to half of the second distance.

2. The micro-wave transducer according to claim 1, wherein in the transducer unit, a ratio of an area of the orthographic projection of the transducer electrode on the dielectric layer to an area of the orthographic projection of the first opening on the dielectric layer is 0.017 to 0.67.

3. The micro-wave transducer according to claim 1, wherein in the transducer unit, an orthographic projection of a center of the first opening on the dielectric layer, an orthographic projection of a center of the transducer electrode on the dielectric layer, and the first intersection point are on a same straight line.

4. The micro-wave transducer according to claim 3, wherein the first opening comprises a third side and a fourth side connected to the first side, and the transducer electrode comprises a fifth side and a sixth side connected to the second side;

a distance between orthographic projections of the third side and the fifth side on the dielectric layer is a third distance, and a distance between orthographic projections of the fourth side and the sixth side on the dielectric layer is a fourth distance; and the third distance is greater than or equal to the first distance, and the fourth distance is greater than or equal to the first distance.

5. The micro-wave transducer according to claim 4, wherein the third distance is equal to the fourth distance.

6. The micro-wave transducer according to claim 1, wherein the first opening has substantially a same shape as the transducer electrode.

7. The micro-wave transducer according to claim 1, further comprising a feeding unit electrically connected to the at least one first micro-strip line.

8. The micro-wave transducer according to claim 7, wherein the at least one first opening comprises $2^n$ first openings, and at least two of the $2^n$ first openings have a same shape and a same size;

the feeding unit further comprises n stages of second microstrip lines; and one second microstrip line at a $1^{st}$ stage is connected to two adjacent first microstrip lines, and the first microstrip lines connected to different second microstrip lines at the $1^{st}$ stage are different; one second microstrip line at an $m^{th}$ stage is connected to two adjacent second microstrip lines at an $(m-1)^{th}$ stage, and the second microstrip lines at the $(m-1)^{th}$ stage connected to different second microstrip lines at the $m^{th}$ stage are different; wherein n is greater than or equal to 2, m is greater than or equal to 2 and less than or equal to n, and both m and n are integers.

9. The micro-wave transducer according to claim 8, wherein the micro-wave transducer comprises a transducing region and a feeding region; the at least one transducer electrode is in the transducing region, and the feeding unit is in the feeding region; the first electrode layer is in the transducing region and the feeding region; and the first electrode layer comprises a first sub-electrode in the transducing region and a second sub-electrode in the feeding region; and an orthographic projection of the second sub-electrode on the dielectric layer covers an orthographic projection of the feeding unit on the dielectric layer.

10. The micro-wave transducer according to claim 9, wherein the first electrode layer has at least one second opening therein, the at least one second opening is in the feeding region; and an orthographic projection of the at least one second opening on the dielectric layer is not overlapped with the orthographic projection of the feeding unit on the dielectric layer.

11. The micro-wave transducer according to claim 10, wherein the orthographic projection of the second sub-electrode on the dielectric layer covers an orthographic projection of then stages of second microstrip lines on the dielectric layer; and at a same position on the dielectric layer, a line width of the orthographic projection of one second microstrip of then stages of second microstrip lines is less than or equal to 0.5 times a width of the orthographic projection of the second sub-electrode.

12. The micro-wave transducer according to claim 11, wherein an orthographic projection of at least one stage of the n stages of second microstrip lines on the dielectric layer divides the orthographic projection of the second sub-electrode on the dielectric layer into two parts with different areas.

13. The micro-wave transducer according to claim 10, wherein the first electrode layer has at least one third opening therein; the at least one third opening is in the transducing region; and a total area of the at least one second opening is greater than a total area of the at least one third opening.

14. The micro-wave transducer according to claim 1, wherein the dielectric layer comprises a flexible material; and the flexible material comprises at least one of polyimide and polyethylene terephthalate.

15. The micro-wave transducer according to claim 14, wherein the dielectric layer comprises a first dielectric sub-layer, a first adhesive layer, a second dielectric sub-layer, a second adhesive layer and a third dielectric sub-layer, which are stacked; a surface of the first dielectric sub-layer away from the first adhesive layer serves as the first surface of the dielectric layer, and a surface of the third dielectric sub-layer away from the second adhesive layer serves as the second surface of the dielectric layer; and a material of the first dielectric sub-layer and the third dielectric sub-layer comprises polyimide, and a material of the second dielectric sub-layer comprises polyethylene terephthalate.

16. The micro-wave transducer according to claim 15, wherein a thickness of the second dielectric sub-layer is greater than a thickness of the first dielectric sub-layer or the third dielectric sub-layer; and thicknesses of the first dielectric sub-layer and the third dielectric sub-layer are equal to each other.

17. The micro-wave transducer according to claim 14, wherein the dielectric layer comprises a first dielectric sub-layer, a first adhesive layer, a second dielectric sub-layer, a second adhesive layer and a third dielectric sub-layer, which are sequentially stacked, wherein a surface of the first dielectric sub-layer close to the first adhesive layer serves as the first surface of the dielectric layer, and a surface of the third dielectric sub-layer close to the second adhesive layer serves as the second surface of the dielectric layer; and a material of the first dielectric sub-layer and the third dielectric sub-layer comprises polyimide, and a material of the second dielectric sub-layer comprises polyethylene terephthalate.

18. The micro-wave transducer according to claim 14, wherein the dielectric layer comprises a first dielectric sub-layer, a first adhesive layer and a second dielectric sub-layer, which are stacked sequentially; a surface of the first dielectric sub-layer away from the first adhesive layer serves as the first surface of the dielectric layer, and a surface of the second dielectric sub-layer away from the first adhesive layer serves as the second surface of the dielectric layer; and a material of the first dielectric sub-layer comprises polyimide, and a material of the second dielectric sub-layer comprises polyethylene terephthalate, or, a material of the first dielectric sub-layer comprises polyethylene terephthalate, and a material of the second dielectric sub-layer comprises polyimide.

19. The micro-wave transducer according to claim 14, wherein a ratio of a thickness of the dielectric layer to a thickness of the transducer electrode is 20 to 450.

20. The micro-wave transducer according to claim 1, further comprising a protective layer on a side of the at least one transducer electrode away from the dielectric layer; and an orthographic projection of the protective layer on the dielectric layer covers an orthographic projection of the at least one transducer electrode on the dielectric layer.

* * * * *